United States Patent
Miwa

(10) Patent No.: US 6,807,824 B1
(45) Date of Patent: Oct. 26, 2004

(54) GLASS ETCHING COMPOSITION AND METHOD FOR FROSTING USING THE SAME

(76) Inventor: Hiroshi Miwa, 3-3-704, Hara 4-chome, Sawara-ku, Fukuoka-shi, Fukuoka 814-0022 (JP)

( * ) Notice: Subject to any disclaimer, the term of this patent is extended or adjusted under 35 U.S.C. 154(b) by 0 days.

(21) Appl. No.: 09/720,122

(22) PCT Filed: Apr. 26, 2000

(86) PCT No.: PCT/JP00/02752

§ 371 (c)(1),
(2), (4) Date: Dec. 21, 2000

(87) PCT Pub. No.: WO00/64828

PCT Pub. Date: Nov. 2, 2000

(30) Foreign Application Priority Data

Apr. 27, 1999 (JP) .......................................... 11-119510

(51) Int. Cl.⁷ .............................................. C03C 15/00
(52) U.S. Cl. ................................ 65/31; 216/97; 216/98
(58) Field of Search ............................... 252/79.1, 79.3, 252/79.4; 216/97, 98; 65/31, 61

(56) References Cited

U.S. PATENT DOCUMENTS

| | | | | |
|---|---|---|---|---|
| 3,616,098 A | * | 10/1971 | Falls | .......................... 428/141 |
| 4,181,623 A | * | 1/1980 | Dillarstone et al. | |
| 4,287,080 A | * | 9/1981 | Siklosi | |
| 4,781,792 A | * | 11/1988 | Hogan | .......................... 216/36 |
| 4,897,213 A | * | 1/1990 | Brink | |
| 4,921,626 A | * | 5/1990 | Rhodenbaugh | |
| 4,985,115 A | * | 1/1991 | De Rossett, Jr. | .............. 216/54 |
| 4,985,323 A | * | 1/1991 | Yokoya et al. | |
| 5,281,350 A | * | 1/1994 | Gimm et al. | |

* cited by examiner

Primary Examiner—Sean Vincent
(74) Attorney, Agent, or Firm—Reed Smith

(57) ABSTRACT

A glass etching composition free from health hazard and environmental pollution, and a frosting method using the composition for a glass surface are provided.

15 Claims, No Drawings

GLASS ETCHING COMPOSITION AND METHOD FOR FROSTING USING THE SAME

This application claims priority to PCT Application PCT/JP00/02752 filed Apr. 26, 2000 and Japanese Patent Application 11/119510 filed Apr. 27,1999.

FIELD OF THE INVENTION

The present invention relates to a glass etching liquid or gel composition comprising ammonium bifluoride, a water-miscible organic solvent and water, in which no hydrofluoric acid is contained and a concentration of the ammonium bifluoride is relatively low. Further, the present invention relates to a frosting method therewith for a glass surface, whereby a glass surface in any shapes, i.e., flat, curved, or tubular shapes is easily frosted.

BACKGROUND OF THE INVENTION

A conventional etching composition for frosting a glass surface typically contains hydrofluoric acid, sulfuric acid or nitric acid. In recent years, an attempt has been made to avoid the use of hydrofluoric acid which has been a fundamental cause for the problems of health hazard and of environmental pollution.

For example, Japanese Patent Publication No. Hei 8-5694 discloses a glass etching composition comprising ammonium bifluoride, water, ferric chloride, sucrose and glycerin.

However, the glass etching composition needs 25 to 35% by weight of ammonium bifluoride, and further comprises 90% by weight of glycerin as a solvent, 12 to 26% by weight of sucrose as a flow modifier and 3.5 to 7.5% by weight of ferric chloride as an activator. Glycerin may be used to form a film on a glass surface. Large amounts of glycerin and ferric chloride contained therein inhibit ammonium bifluoride from diffusing, resulting in a remarkably lowered etching reactivity. Such glass etching composition has very high viscosity, and therefore cannot provide a precise pattern and design on the glass surface. In addition, a large amount of ammonium bifluoride may cause health damages. Accordingly, the glass etching composition cannot be conveniently used, and is not suitable for daily application, but for special application.

The present invention provides a glass etching composition, which solves the above mentioned problems, and also provides a frosting method therewith for a glass surface.

SUMMARY OF THE INVENTION

According to the present invention, a glass etching liquid composition comprising 1 to 10 weight/volume % (hereinafter referred to as w/v %), preferably 2 to 5 w/v % of fluoride, 20 to 80 volume/volume % (hereinafter referred to as v/v %), preferably 20 to 50 v/v % of water and 20 to 80 v/v %, preferably 50 to 80 v/v % of water-miscible organic solvent is provided.

The glass etching composition is gelled by adding a gelling agent.

The glass etching composition gelled or not gelled may further contain sucrose as a stabilizer.

The glass etching composition gelled or not gelled may further contain surfactants.

The glass etching composition gelled or not gelled may further contain at least one of acetic acid, citric acid and phosphoric acid, and a buffer thereof to adjust a pH.

The glass etching composition gelled or not gelled may be colored with a dye.

The fluoride in the glass etching composition gelled or not gelled is at least one compound selected from the group consisting of sodium fluoride, potassium fluoride, ammonium fluoride, sodium bifluoride, potassium bifluoride and ammonium bifluoride.

The water in the glass etching composition gelled or not gelled is selected from the group consisting of tap water, ion exchange water, distilled water, ground water, spring water, filtrate water and a mixture of two or more thereof.

The water-miscible organic solvent in the glass etching composition gelled or not gelled is at least one compound selected from glycerin, and the group consisting of a glycol such as methyl glycol, ethyl glycol, methylene glycol, ethylene glycol, propylene glycol, dimethylene glycol, diethylene glycol, dipropylene glycol, polymethylene glycol and polyethylene glycol, and the group consisting of a glycol ether such as ethylene glycol monomethyl ether, ethylene glycol monoethyl ether, diethylene glycol monomethyl ether, diethylene glycol monoethyl ether, diethylene glycol monoisopropyl ether, diethylene glycol monobuthyl ether, dipropylene glycol monomethyl ether, dipropylene glycol monoethyl ether, dipropylene glycol monoisopropyl ether and dipropylene glycol monobutyl ether, and the group consisting of a alcohol such as methanol, ethanol, propyl alcohol, isopropyl alcohol, butyl alcohol, isobutyl alcohol, 1,2-ethane diol, 1,2-propane diol, 1,3-propane diol, 1,4-butane diol, 1,2,3-propane triol, 1,2,6-hexane triol and sorbitol.

The gelling agent in the glass etching composition gelled is at least one compound selected from the group consisting of hydroxypropyl cellulose, hydroxyethyl cellulose, methyl cellulose, carboxymethyl cellulose, sodium carboxymethyl cellulose, sodium arginate, arabic gum, tragacanth gum, xanthum gum, bentonite, veegum, gelatin, bengl gelatin, polyacrylate, polyacryl amide, polyvinyl alcohol, polyvinyl pyrrolidone, polyvinyl acetate, an acrylate polymer, an isobutyl maleic acid copolymer, an acrylic acid/methacrylic acid copolymer, an acrylic acid/maleic acid copolymer and variants thereof.

The surfactant in the glass etching composition gelled or not is at least one compound selected from the group consisting of an anionic surfactant such as dodecylbenzene sodium sulfonate, an alkylbenzene sodium sulfonate, lignine calcium sulfonate, a perfluoroalkyl sulfonate, a perfluoroalkyl carboxylate and a perfuloroalkyl phosphate, and the group consisting of an non-ionic surfactant such as polyoxyethylene acetyl ether, polyoxyethylene lauryl ether, polyoxyethylene oleil ether, polyoxyethylene stearyl ether, a polyoxyethylene alkyl ether, polyoxyethylene octyl-phenyl ether, polyoxyethylene nonylphenyl ether, sorbitan laurate, sorbitan palmitate, sorbitan oleate, sorbitan stearate, polyoxy-ethylene sorbitan monolaurate, polyoxyethylene sorbitan mono-palmitate, polyoxyethylene sorbitan monooleate and polyoxy-ethylene sorbitan monostearte, and the group consisting of an ampholytic surfactant such as a dimethylalkyl betain, a alkyl glycine, amide betaine, imidazoline, a perfluoroalkylamino sulfonate, a perfluoroalkyl betaine, and the group consisting of a cationic surfactant such as octadecyldimethylbenzylammonium chloride, a alkyldimethylbenzylammonium chloride, tetradecyldimethylbenzylammonium chloride, dioleyldimethylammonium chloride, octadecyl trimethylammonium chloride, a alkyltrimethylammonium chloride, dodecyltrimethylammonium chloride, hexadecyltrimethyl-ammonium chloride, a octadecylamine actate, a hexadecylamine acetate, a perfluoroalkyltrimethylammonium salt and a perfluoro-alkyl quaternary ammonium salt.

The glass etching liquid composition of the present invention is preferably used to frost glass articles. After cleaning on the glass surface by flushing with a cleaning agent and wiping the glass dry, the glass surface where etching is not required is optionally protected by masking. The glass is coated with the glass etching composition by immersing or spraying. After completion the frosting treatment, the glass is cleaned again with water to remove the residual etching composition and the masking therefrom.

The glass etching gel composition of the present invention is preferably used to frost glass articles. After cleaning on the glass surface by flushing with the cleaning agent and wiping the glass dry, the glass surface where etching is not required is optionally protected by masking. The glass is coated with the glass etching composition by immersing, applying with a brush or squeezing from a tube. After completion the frosting treatment, the glass is cleaned again with water to remove the residual etching composition and the masking therefrom.

In the frosting method for a glass surface, the cleaning agent is selected from water, a soap, a household cleanser or a household detergent.

In the frosting method for a glass surface, the masking is made by an oily pen, an oily paint, a resin paint, an acrylic paint, a masking tape, a seal, a silk screen printing method or other printing methods.

DESCRIPTION OF THE PREFERRED EMBODIMENTS

Other features of this invention will become apparent in the course of the following description of exemplary embodiments, which are given for illustration of the invention and are not intended to be limiting thereof.

EXAMPLE 1

An aqueous solution was prepared by dissolving 3 to 30 w/v % of ammonium bifluoride and was colored blue by adding Brilliant Blue FCF. Then, 1 part of the aqueous solution was mixed with 2 parts of propylene glycol. Accordingly, the final glass etching composition consisted 1 to 10 w/v % of ammonium bifluoride.

Specifically, the aqueous solution was prepared by dissolving 12 g of ammonium bifluoride in water. The total amount of the aqueous solution was 100 ml. The aqueous solution was colored blue by adding 0.5 mg of the Brilliant Blue FCF. To the aqueous solution 200 ml of propylene glycol was added, whereby 300 ml of the glass etching composition was obtained. Accordingly, the final glass etching composition consisted 4 w/v % of ammonium bifluoride, 33.3 v/v % of water and 66.7 v/v % of propylene glycol.

Using the glass etching composition, a flat glass panel having a size of 100 mm in length, 100 mm in wide and 2 mm in thickness; a glass cup having a size of 50 mm in outer diameter, 95 mm in height and 1 mm in thickness; and a mirror having a size of 900 mm in outer diameter were frosted as follows: the glass plate, the glass cup and the mirror were washed with tap water and the tap water was wiped off. Then, the glass plate, the glass cup and the mirror were masked by painting a desired area with a blue oily pen and were immersed in the glass etching composition for 5 to 15 minutes. Thereafter, the glass plate, the glass cup and the mirror were removed therefrom and were washed with tap water. Thus, the areas not masked were frosted.

A frosted image density on the glass surface increased, as a concentration of ammonium bifluoride increased, which led to a shortened immersion time. It has been found that sufficient density and uniformity of the frosted image was obtained by immersing the glass surface in 3 to 5 w/v % of ammonium bifluoride for 10 minutes. If more than 5 w/v % of ammonium bifluoride is used, an excellent frosted image density cannot be obtained because the glass surface is partly acid polished. Compared to glycols, glycerin provides a decreased frosted image density.

EXAMPLE 2

An aqueous solution was prepared by dissolving 12 w/v % of ammonium bifluoride and was colored blue by adding Brilliant Blue FCF. Then, 1 part of the aqueous solution was mixed with 1 to 4 parts of propylene glycol, ethylene glycol or glycerin. Accordingly, the final glass etching composition consisted 2.4 to 6 w/v % of ammonium bifluoride.

Specifically, the aqueous solution was prepared by dissolving 12 g of ammonium bifluoride in water. The total amount of the aqueous solution was 100 ml. The aqueous solution was colored blue by adding 0.5 mg of the Brilliant Blue FCF. To the aqueous solution 300 ml of glycerin was added, whereby 400 ml of the glass etching composition was obtained. Accordingly, the final glass etching composition consisted 3 w/v % of ammonium bifluoride, 25 v/v % of water and 75 v/v % of glycerin.

Using the glass etching composition, a flat glass panel having a size of 100 mm in length, 100 mm in wide and 2 mm in thickness; a glass cup having a size of 50 mm in outer diameter, 95 mm in height and 1 mm in thickness; and a mirror having a size of 900 mm in outer diameter were frosted as follows: the glass plate, the glass cup and the mirror were washed with tap water and the tap water was wiped off. Then, the glass plate, the glass cup and the mirror were masked by painting a desired area with a blue oily pen and were immersed in the glass etching composition for 10 minutes. Thereafter, the glass plate, the glass cup and the mirror were removed therefrom and were washed with tap water. Thus, the areas not masked were frosted.

It has been found that sufficient density and uniformity of the frosted image on the glass surface was obtained when a volume ratio of the aqueous solution to glycols or glycerin was 1:2 to 1:3. Compared to glycols, glycerin provides a decreased frosted image density.

EXAMPLE 3

An aqueous solution was prepared by dissolving 16 w/v % of ammonium bifluoride and was colored blue by adding Brilliant Blue FCF. Then, 1 part of the aqueous solution was mixed with 3 parts of one or two more of water-miscible solvents selected from propylene glycol, polyethylene glycol 200 (an average molecular weight of about 200), polyethylene glycol 400 (an average molecular weight of about 400) and glycerin. Accordingly, the final glass etching composition consisted 4 w/v % of ammonium bifluoride.

Specifically, the aqueous solution was prepared by dissolving 16 g of ammonium bifluoride in water. The total amount of the aqueous solution was 100 ml. The aqueous solution was colored blue by adding 0.5 mg of the Brilliant Blue FCF. To the aqueous solution 200 ml of propylene glycol and 100 ml of polyethylene glycol 200 were added, whereby 400 ml of the glass etching composition was obtained. Accordingly, the final glass etching composition consisted 4 w/v % of ammonium bifluoride, 25 v/v % of water, 50 v/v % of propylene glycol and 25 v/v % of polyethylene glycol 200.

Using the glass etching composition, a flat glass panel having a size of 100 mm in length, 100 mm in wide and 2 mm in thickness was frosted as follows: the glass plate was washed with tap water and the tap water was wiped off. Then, the glass plate was masked by painting a desired area with a blue oily pen and was immersed in the glass etching composition for 5 to 10 minutes. Thereafter, the glass plate was removed therefrom and was washed with tap water. Thus, the areas not masked were frosted.

A frosted image density on the glass surface decreased, as both a concentration and an average molecular weight of the polyethylene glycol increased. Polymerization degree of polyethylene glycol is not especially limited. In view of a production of the glass etching composition, it is preferred that polyethylene glycol have an average molecular weight of about 200 to 400, since such polyethylene glycol is liquid. As a concentration of glycerin increased, the frosted image density decreased, as is the case with polyethylene glycol. The same result can be obtained using diethylene glycol instead of propylene glycol.

EXAMPLE 4

An aqueous solution was prepared by dissolving 15 w/v % of ammonium bifluoride and was colored blue by adding Brilliant Blue FCF. Then, 1 part of the aqueous solution was mixed with 2 to 3 parts of propylene glycol and 0 to 1 part of isopropyl alcohol or 1,2,6-hexane triol. Accordingly, the final glass etching composition consisted 3 to 5 w/v % of ammonium bifluoride.

Specifically, the aqueous solution was prepared by dissolving 15 g of ammonium bifluoride in water. The total amount of the aqueous solution was 100 ml. The aqueous solution was colored blue by adding 0.5 mg of the Brilliant Blue FCF. To the aqueous solution 300 ml of propylene glycol and 100 ml of isopropyl alcohol were added, whereby 500 ml of the glass etching composition was obtained. Accordingly, the final glass etching composition consisted 3 w/v % of ammonium bifluoride, 20 v/v % of water, 60 v/v % of propylene glycol and 20 v/v % of polyethylene glycol 200.

Using the glass etching composition, a flat glass panel having a size of 100 mm in length, 100 mm in wide and 2 mm in thickness was frosted as follows: the glass plate was washed with tap water and the tap water was wiped off. Then, the glass plate was masked by painting a desired area with a blue oily pen and was immersed in the glass etching composition for 5 to 10 minutes. Thereafter, the glass plate was removed therefrom and was washed with tap water. Thus, the areas not masked were frosted.

A frosted image density on the glass surface decreased, as a concentration of the alcohols increased. The same result can be obtained using other alcohols, but it may be difficult to obtain a uniform frosted surface.

EXAMPLE 5

An aqueous solution was prepared by dissolving 12 w/v % of ammonium bifluoride and 0 to 20 w/v % of sorbitol. The aqueous solution was colored blue by adding Brilliant Blue FCF. Then, 1 part of the aqueous solution was mixed with 3 parts of propylene glycol. Accordingly, the final glass etching composition consisted 3 w/v % of ammonium bifluoride and 0 to 5 w/v % of sorbitol.

Specifically, the aqueous solution was prepared by dissolving 12 g of ammonium bifluoride and 20 g of sorbitol in water. The total amount of the aqueous solution was 100 ml. The aqueous solution was colored blue by adding 0.5 mg of the Brilliant Blue FCF. To the aqueous solution 300 ml of propylene glycol was added, whereby 400 ml of the glass etching composition was obtained. Accordingly, the final glass etching composition consisted 3 w/v % of ammonium bifluoride, 5 w/v % of sorbitol, 25 v/v % of water and 75 v/v % of propylene glycol.

Using the glass etching composition, a flat glass panel having a size of 100 mm in length, 100 mm in wide and 2 mm in thickness was frosted as follows: the glass plate was washed with tap water and the tap water was wiped off. Then, the glass plate was masked by painting a desired area with a blue oily pen and was immersed in the glass etching composition for 5 to 10 minutes. Thereafter, the glass plate was removed therefrom and was washed with tap water. Thus, the areas not masked were frosted.

A frosted image density on the glass surface increased, as a concentration of sorbitol in the glass etching composition increased. However, if a part of propylene glycol is replaced of other water-miscible organic solvents, the frosted image density may decreases. Thus, the frosted image density does not always depend on the concentration of sorbitol.

EXAMPLE 6

An aqueous solution was prepared by dissolving 12 w/v % of ammonium bifluoride and 0 to 3 v/v % or w/v % of one or two more of surfactants selected from polyoxyethylene octylphenyl ether, polyoxyethylene nonylphenyl ether, polyoxyethylene sorbitan monolaurate, lignin calcium sulfonate, and dodecylbenzene sodium sulfonate. The aqueous solution was colored blue by adding Brilliant Blue FCF. Then, 1 part of the aqueous solution was mixed with 2 parts of propylene glycol. Accordingly, the final glass etching composition consisted 4 w/v % of ammonium bifluoride and 0 to 1 v/v % or 0 to 1 w/v % of the surfactant(s).

Specifically, the aqueous solution was prepared by dissolving 12 g of ammonium bifluoride and 1.5 g of polyoxyethylene octylphenyl ether in water. The total amount of the aqueous solution was 100 ml. The aqueous solution was colored blue by adding 0.5 mg of the Brilliant Blue FCF. To the aqueous solution 200 ml of propylene glycol was added, whereby 300 ml of the glass etching composition was obtained. Accordingly, the final glass etching composition consisted 4 w/v % of ammonium bifluoride, 0.5 w/v % of polyoxyethylene octylphenyl ether, 33.3 v/v % of water and 66.7 v/v % of propylene glycol.

Using the glass etching composition, a flat glass panel having a size of 100 mm in length, 100 mm in wide and 2 mm in thickness was frosted as follows: the glass plate was washed with tap water and the tap water was wiped off. Then, the glass plate was masked by painting a desired area with a blue oily pen and was coated with the glass etching composition by spraying. Thereafter the glass plate was allowed to stand for 5 minutes and was washed with tap water. Thus, the areas not masked were frosted.

The surfactants did not significantly affect the frosted image density on the glass surface, but promoted adhering the glass etching composition to the glass surface evenly. Other surfactants can provide the same effect more or less.

EXAMPLE 7

An aqueous solution was prepared by dissolving 12 w/v % of ammonium bifluoride and 0 to 30 w/v % of sucrose. The aqueous solution was colored blue by adding Brilliant Blue FCF. Then, 1 part of the aqueous solution was mixed with 2 parts of propylene glycol. Accordingly, the final glass etching composition consisted 4 w/v % of ammonium bifluoride and 0 to 10 w/v % of sucrose.

Specifically, the aqueous solution was prepared by dissolving 12 g of ammonium bifluoride and 15 g of sucrose in water. The total amount of the aqueous solution was 100 ml. The aqueous solution was colored blue by adding 0.5 mg of the Brilliant Blue FCF. To the aqueous solution 200 ml of propylene glycol was added, whereby 300 ml of the glass etching composition was obtained. Accordingly, the final glass etching composition consisted 4 w/v % of ammonium bifluoride, 5 w/v % of sucrose, 33.3 v/v % of water and 66.7 v/v % of propylene glycol.

Using the glass etching composition, a flat glass panel having a size of 100 mm in length, 100 mm in wide and 2 mm in thickness was frosted as follows: the glass plate was washed with tap water and the tap water was wiped off. Then, the glass plate was masked by painting a desired area with a blue oily pen and was immersed in the glass etching composition for 5 to 10 minutes. Thereafter, the glass plate was removed therefrom and was washed with tap water. Thus, the areas not masked were frosted.

A frosted image density on the glass surface increased, as a concentration of sucrose in the glass etching composition increased. However, if a part of propylene glycol is replaced of other water-miscible organic solvents, the frosted image density may decreases. Thus, the frosted image density does not always depend on the concentration of sucrose.

EXAMPLE 8

An aqueous solution was prepared by dissolving 5 to 20 w/v % of ammonium bifluoride and was colored blue by adding Brilliant Blue FCF. Then, 1 part of the aqueous solution was mixed with 1 part of propylene glycol. Accordingly, the final glass etching composition consisted 2.5 to 10 w/v % of ammonium bifluoride.

Specifically, the aqueous solution was prepared by dissolving 20 g of ammonium bifluoride in water. The total amount of the aqueous solution was 100 ml. The aqueous solution was colored blue by adding 0.5 mg of the Brilliant Blue FCF. To the aqueous solution 100 ml of propylene glycol was added, whereby 200 ml of the glass etching composition was obtained. Accordingly, the final glass etching composition consisted 10 w/v % of ammonium bifluoride, 50 v/v % of water and 50 v/v % of propylene glycol.

Using the glass etching composition, a flat glass panel having a size of 100 mm in length, 100 mm in wide and 2 mm in thickness; and a glass cup having a size of 50 mm in outer diameter, 95 mm in height and 1 mm in thickness were frosted as follows: the glass plate and the glass cup were washed with tap water and the tap water was wiped off. Then, the glass plate and the glass cup were masked by painting a desired area with a blue oily pen and were immersed in the glass etching composition for 5 to 10 minutes. Thereafter, the glass plate and the glass cup were removed therefrom and were washed with tap water. Thus, the areas not masked were frosted.

A frosted image density on the glass surface increased, as a concentration of ammonium bifluoride increased, which led to a shortened immersion time. However, an excellent frosted image density sometimes cannot be obtained because the glass surface is partly acid polished.

EXAMPLE 9

An aqueous solution was prepared by dissolving 1.5 to 15 w/v % of ammonium bifluoride and 0 to 1.5 v/v % or w/v % of one or two more of surfactants selected from polyoxyethylene octylphenyl ether, polyoxyethylene nonylphenyl ether, polyoxyethylene sorbitan monolaurate, lignin calcium sulfonate, and dodecylbenzene sodium sulfonate. The aqueous solution was colored blue by adding Brilliant Blue FCF. Then, 2 parts of the aqueous solution was mixed with 1 part of propylene glycol. Accordingly, the final glass etching composition consisted 1 to 10 w/v % of ammonium bifluoride and 0 to 1 v/v % or 0 to 1 w/v % of the surfactant(s).

Specifically, the aqueous solution was prepared by dissolving 12 g of ammonium bifluoride and 1.2 g of dodecylbenzene sodium sulfonate in water. The total amount of the aqueous solution was 200 ml. The aqueous solution was colored blue by adding 0.5 mg of the Brilliant Blue FCF. To the aqueous solution 100 ml of propylene glycol was added, whereby 300 ml of the glass etching composition was obtained. Accordingly, the final glass etching composition consisted 8 w/v % of ammonium bifluoride, 0.8 w/v % of dodecylbenzene sodium sulfonate, 66.7 v/v % of water and 33.3 v/v % of propylene glycol.

Using the glass etching composition, a flat glass panel having a size of 100 mm in length, 100 mm in wide and 2 mm in thickness; and a glass cup having a size of 50 mm in outer diameter, 95 mm in height and 1 mm in thickness were frosted as follows: the glass plate and the glass cup were washed with tap water and the tap water was wiped off. Then, the glass plate and the glass cup were masked by painting a desired area with a blue oily pen and were immersed in the glass etching composition for 5 to 10 minutes. Thereafter, the glass plate and the glass cup were removed therefrom and were washed with tap water. Thus, the areas not masked were frosted.

A frosted image density on the glass surface increased, as a concentration of ammonium bifluoride increased, which led to a shortened immersion time. However, the glass surfaces may be partly acid polished, and the frosted surfaces may have roughened portions. The surfactants tend to solve these problems more or less.

EXAMPLE 10

An aqueous solution was prepared by dissolving 12 w/v % of ammonium bifluoride and was colored blue by adding Light Green SFY. Then, 1 part of the aqueous solution was mixed with 2 parts of propylene glycol. A glass etching homogeneous gel composition was prepared by adding 1 to 10 w/v % of hydroxypropyl cellulose to the glass etching composition and stirring them. Accordingly, the final glass etching composition consisted 4 w/v % of ammonium bifluoride.

Specifically, the aqueous solution was prepared by dissolving 12 g of ammonium bifluoride in water. The total amount of the aqueous solution was 100 ml. The aqueous solution was colored green by adding 0.5 mg of the Light Green SFY. To the aqueous solution 200 ml of propylene glycol was added, whereby 300 ml of the glass etching composition was obtained. A glass etching homogeneous gel composition was prepared by adding 10.5 g of hydroxypropyl cellulose to the glass etching composition and stirring them. Accordingly, the final glass etching gel composition consisted 4 w/v % of ammonium bifluoride, 33.3 v/v % of water, 66.7 v/v % of propylene glycol and 3.5 w/v % of hydroxypropyl cellulose. Using the glass etching composition, a flat glass panel having a size of 100 mm in length, 100 mm in wide and 2 mm in thickness; a glass cup having a size of 50 mm in outer diameter, 95 mm in height and 1 mm in thickness; and a mirror having a size of 900 mm in outer diameter were frosted as follows: the glass plate, the glass cup and the mirror were washed with tap water and the tap water was wiped off. Then, the glass plate, the glass cup and the mirror were masked by painting a desired area with a blue oily pen and were coated with the glass etching gel composition by applying with a brush, or squeezing from a tube. Thereafter, the glass plate, the glass cup and the mirror were allowed to stand for 5 to 10 minutes and were washed with tap water. Thus, the areas not masked were frosted.

For applying the glass etching gel composition with a brush to the glass surface, it is preferred that about 1 to 3.5 w/v % of hydroxypropyl cellulose is used. For squeezing the glass etching gel composition from a tube onto the glass surface, it is preferred that about 4 w/v % or more of hydroxypropyl cellulose is used. An average viscosity of hydroxypropyl cellulose is not especially limited and, for example, is within a range of 150 to 400 mps (2% solution, at 20° C.) for obtaining a sufficient frosted image density and for ease of handling. If other gelling agents are used instead of hydroxypropyl cellulose, large amounts of the gelling agents are sometimes required for providing a homogeneous gel composition. With such other gelling agents, it is hard to provide a sufficient frosted image density and a uniform frosted surface.

FIELD OF THE INDUSTRIAL UTIRITY

(DETEILED DESCRIPTION OF THE INVENTION)

According to the present invention as claimed in claims 1, 7, 8 and 9, the glass etching composition does not contain harmful hydrofluoric acid and contains a low amount of a fluoride, i.e., 4 w/v % or less of ammonium bifluoride that provides an excellent frosted glass surface. The glass etching composition of the present invention is thus highly safety. For example, when ammonium bifluoride is orally administered to mice, a $LD_{50}$, value is 129 mg/kg. Based on a calculation in terms of the $LD_{50}$, value of ammonium bifluoride, the glass etching composition exhibits a $LD_{50}$, of about 3225 mg/kg. A criterion $LD_{50}$ value of a deterious substance is 30 to 300 mg/kg in Japan. Thus, the glass etching composition of the present invention has 10 times or more safe $LD_{50}$ value than the criterion $LD_{50}$, value.

Furthermore, when the frosting is performed using the glass etching composition of the present invention containing ammonium bifluoride, it is not required to adjust pH by adding acetic acid, citric acid and phosphoric acid, and a buffer thereof. Since ammonium bifluoride has no chance to contact with acids or alkalis excessively, a production of harmful hydrogenfluoride gas or ammonia gas can be successfully prevented. In a frosting method using a conventional glass etching composition containing fluorine, protective equipment such as goggles and a pair of rubber gloves for safety precautions is essential, and an exhauster is also required. In contrast, the glass etching composition of the present invention can be handled by hand without requiring the exhauster. In fact, when the glass etching composition of the present invention contacts with a skin during a frosting operation, no problems are raised.

In addition, in the glass etching composition of the present invention, a ratio of water to a water-miscible organic solvent such as glycols and glycerin is entirely different from that of the conventional composition. This allows a content of a fluoride, i.e., ammonium bifluoride to be remarkably decreased.

The glass etching composition of the present invention can etch a glass surface very gently, and form uniform and fine pits thereon. The resultant frosted surface is very smooth and is compared with a normal transparent glass surface. It is possible that any characters and graphics are printed on the frosted surface using an ink in gold, silver or other colors without losing the luster of the ink. Thus, a graceful and dignified glass surface can be obtained.

Furthermore, surfaces of very thin glass, curved glass and tubular glass, which are difficult to be frosted with the conventional frosting composition, can be frosted using the glass etching composition of the present invention.

The frosting with the etching composition of the present invention can be performed at room temperature and does not proceed acutely. Therefore, a density of the frosted surface can be adjusted by changing an etching time, i.e., 1 minute, 5 minutes, or 10 minutes. Also, the density of the frosted surface can be adjusted by changing a concentration of a fluoride, i.e., ammonium bifluoride, by changing a ratio of water to a water-miscible organic solvent such as glycols and glycerin, or by adding other alcohols. In general, the surfactant increases wetting ability of the glass etching composition through a surface tension depression and promotes the glass etching composition to be deposited uniformly on the glass surface. In the glass etching composition of the present invention, the water-miscible organic solvent acts like a surfactant.

As described above, the glass etching liquid composition of the present invention comprises a small amount of a fluoride, i.e., ammonium bifluoride; glycols, glycerin, alcohols and surfactants that are used for cosmetics and pharmaceuticals; and sucrose that is used for foods. The glass etching gel composition of the present invention comprises the glass etching liquid composition and a gelling agent such as hydroxypropyl cellulose that is used for cosmetics and pharmaceuticals. Advantageously, the glass etching composition of the present invention solves environmental and health hazard problems, which are the most significant problems in the conventional glass etching composition containing fluorine.

The glass etching composition of the present invention is free from hydrofluoric acid, sulfuric acid, nitric acid and hydrochloric acid. Thus, the glass etching composition can be safely used in various printing methods including a silk screen printing method that is suitable for etching a glass surface to provide a pattern, a picture and a character. Further, a portion of the picture, the pattern and the character on a glass surface can be frosted by masking with a masking tape, a self-made seal, an oily pen, an oil paint, a resin paint and an acrylic paint.

In summary, the glass etching composition of the present invention can frost a glass surface having any of flat, curved, and tubular shapes, and provide safely and easily a picture, a pattern and a character on a portion of the glass surface by masking, without causing environmental pollution.

Furthermore, neither special pretreatment nor aftertreatment is needed for the frosting with the glass etching composition of the present invention.

The glass etching composition of the present invention has heat resistance, moisture resistance, resistance to ultraviolet ray and weather resistance, and therefore can be used repeatedly. A water phase and a water-miscible organic solvent phase in the glass etching composition of the present invention can be separated by filtration with a special filter paper, whereby the water phase containing a degraded fluoride is discarded, and the water-miscible organic solvent phase can be recovered and recycled.

According to the present invention as claimed in claims 2 to 10, the glass etching gel composition having various viscosities can be prepared by changing a concentration of the gelling agent. The gelling agent promotes an adhesion of the glass etching composition to a glass surface, resulting in an excellent frosted surface.

According to the present invention as claimed in claim 3, sucrose contributes to stabilize the glass etching composition.

According to the present invention as claimed in claims 4 and 11, the surfactant increases wetting ability of the glass etching composition through a surface tension depression and promotes the glass etching composition to be deposited uniformly on the glass surface upon frosting with a spray.

According to the present invention as claimed in claim 5, acetic acid and a buffer thereof adjusts a pH of the glass etching composition to provide stability and ease of use.

According to the present invention as claimed in claim 6, the glass etching composition is colored with the dye. The dye also works as a safety marker. When the glass etching composition is discarded by diluting it with water, a color of the dye diluted is given as an indication of the safe concentration. Any water-soluble dyes can be used.

According to the present invention as claimed in claim 12, a desired pattern and design can be easily produced by immersing a masked glass surface into the glass etching composition or coating a masked glass surface with the glass etching composition, and washing off the composition. An artistic glass surface can be made.

According to the present invention as claimed in claim 13, the glass etching gel composition can be coated by applying with a brush, or squeezing from a tube, whereby a desired pattern and design can be easily produced on a glass surface. Such glass etching gel composition is easily stored and handled.

According to the present invention as claimed in claim 14, after etching, the glass etching liquid or gel composition containing a fluoride adhered to a glass surface can be easily and entirely washed off with water.

According to the present invention as claimed in claim 15, a wide variety of patterns and designs can be easily and precisely produced by masking with an oily pen, an oily paint, an acrylic paint, a masking tape and a seal, or by a silk screen printing method and other printing methods. Artistic values of the glass can be further enhanced.

What is claimed is:

1. A glass etching composition consisting essentially of 1 to 10 w/v % of a fluoride selected from the group consisting of sodium fluoride, potassium fluoride, ammonium fluoride, sodium bifluoride, potassium bifluoride and ammonium bifluoride, 20 to 80 v/v % of water and 20 to 80 v/v % of a water-miscible organic solvent selected from the group consisting of glycerin, a glycol, a glycol ether and an alcohol.

2. A glass etching composition consisting essentially of, 1 to 10 w/v % of a fluoride selected from the group consisting of sodium fluoride, potassium fluoride, ammonium fluoride, sodium bifluoride, potassium bifluoride and ammonium bifluoride, 20 to 80 v/v % of water, 20 to 80 v/v % of a water-miscible organic solvent selected from the group consisting of glycerin, a glycol, a glycol ether and an alcohol, and 1 to 10 w/v % of a gelling agent selected from the group consisting of hydroxyproply cellulose, hydroxyethyl cellulose, methyl cellulose, carboxymethyl cellulose and sodium carboxymethyl cellulose.

3. The glass etching composition as claimed in claim 1 or 2, further comprising sucrose as a stabilizer.

4. The glass etching composition as claimed in claim 1 or 2, further comprising at least one surfactant selected from the group consisting of an anionic surfactant selected from the group consisting of dodecylbenzene sodium solfonate, alkylbenzene sodium sulfonate, lignine calcium sulfonate, perfluoroalkyl sulfonate, perfluoroalkyl carboxylate and perfluoroalkyl phosphate, a non-ionic surfactant selected from the group consisting of polyoxyethylene acetyl ether, polyoxyethylene lauryl ether, polyoxyethylene oleil ether, polyoxyethylene stearyl ether, polyoxyethylene alkyl ether, polyoxyethylene octylphenyl ether, polyoxyethylene nonylphenyl ether, sorbitan laurate, sorbitan palmitate, sorbitan oleate, sorbitan stearate, polyoxyethylene sorbitan monolaurate, polyoxyethylene sorbitan monopalmitate, polyoxyethylene sorbitan monoleate and polyoxyethylene sorbitan monostearate, an ampholytic surfactant selected from the group consisting of dimethylalkyl betaine, an alkyl glycine, amide betaine, imidazoline, perfluoroalkylamino sulfonate and perfluoroalkyl betaine, and a cationic surfactant selected from the group consisting of octadecyldimethylbenzylammonium chloride, alkyldimethylbenzylammonium chloride, tetradecyldimethylbenzylammonium chloride, dioleyldimethylammonium chloride, octadecyltrimethylammonium chloride, alkyltrimethylammonium chloride, dodecyltrimethylammonium chloride, hexadecyltrimethylammonium chloride, a octadecylamine acetate, hexadecylamine acetate, perfluoroalkyltrimethylammonium salt and perfluoroalkyl quaternary ammonium salt.

5. The glass etching composition as claimed in claim 1 or 2, further comprising at least one selected from the group consisting of acetic acid, citric acid and phosphoric acid, and a buffer for adjusting the pH of the glass etching composition.

6. The glass etching composition as claimed in claim 1 or 2, further comprising a dye for coloring the glass etching composition.

7. The glass etching composition as claimed in claim 1 or 2, wherein said glycol is at least one selected from the group consisting of methyl glycol, ethyl glycol, methylene glycol, ethylene glycol, propylene glycol, dimethylene glycol, diethylene glycol, dipropylene glycol, polymethylene glycol, and polyethylene glycol.

8. The glass etching composition as claimed in claim 1 or 2, wherein said glycol ether is at least one selected from the group consisting of ethylene glycol monomethyl ether, ethylene glycol monoethyl ether, diethylene glycol monomethyl ether, diethylene glycol monoethyl ether, diethylene glycol monoisopropyl ether, diethylene glycol monobutyl ether, dipropylene glycol monomethyl ether, dipropylene glycol monoethyl ether, dipropylene glycol monoisoprpyl ether, and dipropylene glycol monobutyl ether.

9. The glass etching composition as claimed in claim 1 or 2, wherein said alcohol is at least one selected from the group consisting of methanol, ethanol, propyl alcohol, isopropyl alcohol, butyl alcohol, isobutyl alcohol, 1,2-ethane diol, 1,2-propane diol, 1,3-propane diol, 1,4-butane diol, 1,2,3-propane triol, 1,2,6-hexane triol and sorbitol.

10. The glass etching composition as claimed in claim 1 or 2, wherein the concentration of said fluoride is 2 to 5 w/v %.

11. A frosting method for frosting a glass surface by using a glass etching composition, comprising the steps of:
(a) cleaning the glass surface with a cleaning agent and wiping the glass surface dry,
(b) protecting the glass surface by masking a portion of the glass surface where etching is not required, (c) coating the glass surface with a glass etching composition by immersing or spraying to etch the glass surface, and d) cleaning the glass surface again, and removing the glass etching composition and the masking therefrom;

wherein said glass etching composition is a glass etching composition consisting essentially of 1 to 10 w/v % of a fluoride selected from the group consisting of sodium fluoride, potassium fluoride, ammonium fluoride, sodium bifluoride, potassium bifluoride and ammonium bifluoride, 20 to 80 v/v % of water, 20 to 80 v/v % of a water-miscible organic solvent selected from the group consisting of glycerin, a glycol, a glycol ether and an alcohol, or a glass etching composition consisting essentially of 1 to 10 w/v % of a fluoride selected from the group consisting of sodium fluoride, potassium fluoride, ammonium fluoride, sodium bifluoride, potassium bifluoride and ammonium bifluoride, 20 to 80 v/v % of water, 20 to 80 v/v % of a water-miscible organic solvent selected from the group consisting of glycerin, a glycol, a glycol ether and an alcohol and 1 to 10 w/v % of a gelling agent selected from the group consisting of hydroxyproply cellulose, hydroxyethyl cellulose, methyl cellulose, carboxymethyl cellulose and sodium carboxymethyl cellulose.

12. The frosting method as claimed in claim 11, wherein said cleaning agent is at least one selected from the group consisting of water, a soap, a household cleanser and a household detergent.

13. The frosting method as claimed in claim 11, wherein said masking is made by an oily pen, an oily paint, a resin paint, an acrylic paint, a masking tape, a seal, a silk screen printing method, or other printing methods.

14. The frosting method as claimed in claim 11, wherein the glass etching composition is coated by applying with a brush or squeezing from a tube.

15. The frosting method as claimed in claim 11, wherein the concentration of said fluoride is 2 to 5 w/v %.

* * * * *